Aug. 3, 1965   L. V. TARDOSKEGYI   3,198,414
MOLTEN SOLDER BATH WITH UNIFORMLY DISPERSED ADDITIVE
Filed July 30, 1963

INVENTOR
LOUIS V. TARDOSKEGYI
BY

ATTORNEYS.

United States Patent Office 3,198,414
Patented Aug. 3, 1965

3,198,414
MOLTEN SOLDER BATH WITH UNIFORMLY DISPERSED ADDITIVE
Louis V. Tardoskegyi, Montreal, Quebec, Canada, assignor to Electrovert Manufacturing Co. Ltd., Montreal, Quebec, Canada, a corporation of Canada
Filed July 30, 1963, Ser. No. 298,757
6 Claims. (Cl. 228—37)

This invention relates to soldering apparatus, particularly of the wave soldering type, and is particularly directed to novel means for uniformly dispersing an additive throughout molten solder forming a standing wave.

In the art of tin plating and soldering, it has long been established that the use of organic or mineral oils in connection with the operations has the advantageous effect of achieving an even distribution and proper application of solder or of tin coatings on metal surfaces. The purpose of using such oil is to improve the surface and interfacial tension conditions existing between a solder and a fluxed board, for example, during the soldering operation, and to develop a type of "skin effect" in the nature of a smooth, continuous and very thin and substantially invisible protective layer of oil which will prevent oxidation of the solder surface between soldering intervals. Thus, the oil will act as an oxide barrier during the soldering operation itself, and thereby contributes to the fluxing action.

The application of a layer of oil or other additive to the surface of a stationary or quiescent solder bath, as well as the maintenance of such layer, does not present any difficulties irrespective of whether the oil used is organic or mineral. However, in the more modern technique of wave soldering, wherein there is a projecting wave of solder which is continuously replenishing and which flows back into a solder tank, the application of an even distributed and continuous layer of oil or other additive, and particularly the application and maintenance of a layer of an accurately controllable and predetermined thickness, presents a very serious problem. This is done due to the continuous reforming and reproduction of the wave from circulating molten solder.

It is important that changes in the constitution, characteristics and purity of the oil should be avoided in order that there may be a consistent quality of operation at all times. Furthermore, the amount of oil applied and distributed on the surface of the wave should be accurately adaptable to the height and surface area of the wave and to other operation conditions.

Various attempts have been made to introduce oil into molten solder wave apparatus. One arrangement for doing this has been to pour oil onto the surface of the molten solder in the solder pot or tank, for gravitational flow to a vent at the suction or intake end of the solder pump. The purpose was to provide for mixing of the oil with the solder, and the oil is continuously recirculated and reused after application to printed circuit boards or the like which are brought into contact with the standing solder wave.

The disadvantage of this, and of other known arrangements, is that, due to the recirculation, the oil becomes thermally degraded, and is subjected to oxidation by exposure to heat, light and metallic catalysts such as copper and iron. Consequently, there is a contamination of the oil with a result that there is no longer a consistent and uniform quality to the oil floating on top of the solder wave. Also, the constitution of the oil changes to some extent due to partial evaporation of ingredients by the relatively high heat. An additional disadvantage of known methods is that they do not provide a uniform distribution of oil throughout the solder, the oil appearing irregularly as globules or traces, and not being dispersed uniformly throughout the molten solder.

In accordance with the present invention, it has been found that an atomized additive, such as oil, can be dispersed uniformly throughout a molten solder bath by utilizing a turbine pump element to pump the molten solder from a return or overflow section of the solder tank to a supply section and thence upwardly through a nozzle upon which the standing solder wave is formed. An important feature of the pump is the rotor element, which is arranged to discharge the oil peripherally at high velocity. By injecting the additive, such as oil, directly into the high velocity solder stream as the latter is discharged from the periphery of this rotor, it has been found that the additive is uniformly emulsified and uniformly dispersed in the molten solder.

The amount of additive, such as oil, which is supplied to the standing wave is precisely controllable, and is entirely independent of the thickness of an oil layer covering a molten solder surface and such as would be returned to the solder pump by gravitational flow. The apparatus of the invention further eliminates any possibility of hazards which might interfere with continuous and adequate application of oil, such as might be caused by partial or complete plugging of ducts due to solids, carbonized particles, and the like resulting from deterioration or degradation of the oil.

With the hitherto used continuously circulation of the oil with gravity flow back to the pump, the oil, which is exposed continuously to the high solder temperature ranging from 420° F. up to 500° F., will be immediately subject to thermal degradation, as well as to oxidation by exposure to heat, light and metallic catalysts, to partial evaporation, to and formation of impurities in liquid and solid form which will change the characteristics of the oil. These disadvantageous factors are augmented by the increase of carbonization and polymerization. With the arrangement of the present invention, in which the oil is injected directly into the molten solder as it is discharged at high velocity from the periphery of the pump rotor, and atomized thereby, there is no opportunity for any of these disadvantageous circumstances to occur.

For an understanding of the principles of the invention, reference is made to the following description of a typical embodiment thereof as illustrated in the accompanying drawings. In the drawings.

Figure 1:
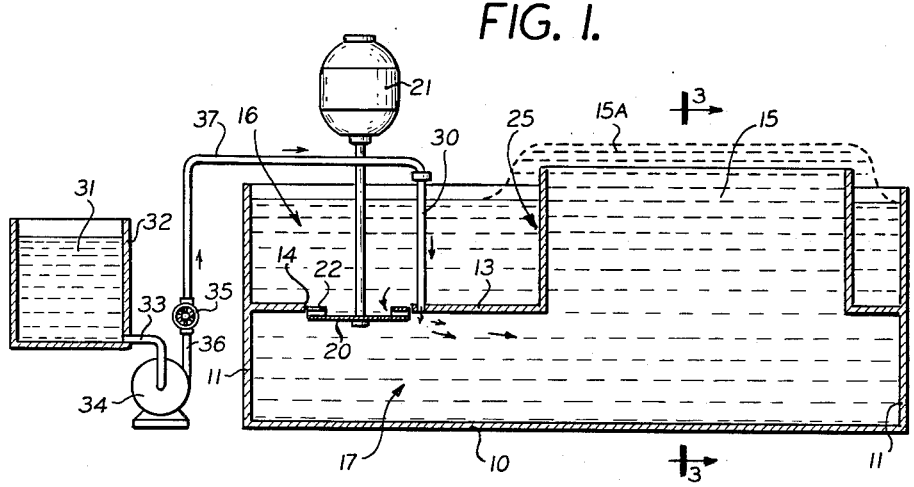
FIG. 1 is a longitudinal sectional view, somewhat schematic in nature, through one form of apparatus embodying the invention.
Figure 2:
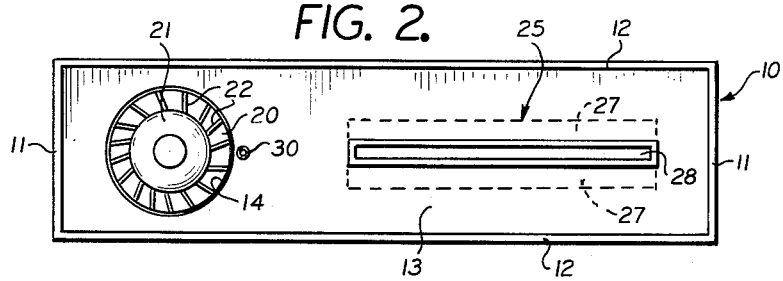
FIG. 2 is a top plan view of the solder tank and nozzle shown in FIG. 1.
Figure 3:
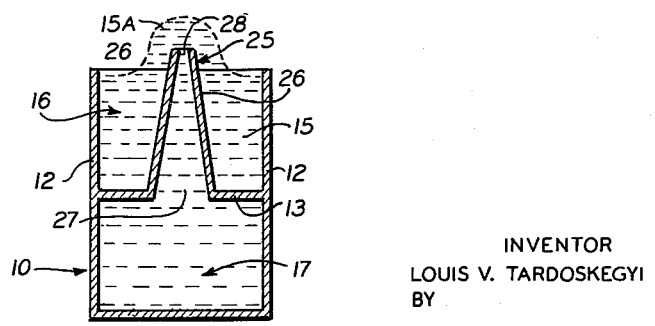
FIG. 3 is a transverse vertical sectional view taken on the line 3—3 of FIG. 1.

Referring to the drawings, a tank 10, containing molten solder 15, is illustrated as having opposite end walls 11 and opposite side walls 12. A substantially horizontal partition 13 interconnects the end and side walls about midway of the height of tank 10, and partition 13 is formed with an opening or port 14 therethrough. Partition 13 divides tank 10 into what may be defined as a return section 16, for overflowing molten solder, and a supply section 17.

Molten solder from return section 16 is supplied, under pressure, to supply section 17 by means of a turbine pump having a rotor 20 driven by a motor 21. Rotor 20 is formed with vanes 22 so that, upon rotation of rotor 20 by the motor 21, the molten or liquid solder is discharged peripherally under pressure from rotor 20. This rotor is disposed in operative relation substantially in or immediately below port 14. The molten or liquid solder under pressure in supply section 17 is forced upwardly through a nozzle 25 extending upwardly from partition 13. Nozzle 25 is relatively long and narrow in the longitudinal direction of tank 11, and has side walls 26 converging upwardly from the nozzle entry 27 in partition 13 to form a relatively elongated and relatively narrow, and preferably substantially rectangular, discharge slot 28. The upper end of nozzle 25 extends somewhat above the upper edge of tank 11, for example by an amount of the order of 0.5 inch.

By the described arrangement, molten solder under pressure is forced upwardly through nozzle 25 and issues from discharge slot 28 to form a continuously replenished and continuously reconstituted standing wave 15A of molten solder which overflows into return section 16 of tank 10. This standing wave 15A has a controllable and readily adjustable height above the upper end of nozzle 25 so that printed circuitboards and the like may be passed thereover for soldering of connections and without interfering with any of the structural parts of tank 10 or nozzle 25. The height of wave 15A can be adjusted readily by adjusting the proper speed for motor 21 and thus the pressure existing in the supply section 17 of tank 10.

In accordance with the invention, an additive, such as, for example, an oil, is injected into the molten soldering entering section 17 in such a manner as to form a uniformly dispersed emulsion in the molten solder delivered to nozzle 25 to form standing wave 15A. For this purpose, an atomizer 30 is so disposed as to inject additive directly into the high velocity stream of molten solder discharged from the periphery of rotor 20. It is important that the additive be injected exactly at this position, in order to assure thorough and uniform dispersion of the additive in the high velocity molten solder stream with resulting emulsification of the additive. If the atomized additive is not injected into the molten solder exactly at the discharge exit of rotor 20, such thorough and uniform distribution of the additive will not be attained.

The additive 31, which is preferably in liquid or in a solution form, is contained in a tank 32 having an outlet 33 connected to the inlet of a motor driven pump 34. The outlet of pump 34 is connected by a conduit 36 to a control valve 35 which is, in turn, connected by a conduit 37 to the atomizer 30. By means of valve 35, the amount of additive delivered to atomizer 30 can be precisely controlled in accordance with the desired quantity of additive to be added to the molten solder supplied to the nozzle 25. This, in turn, is influenced by the desired thickness of the layer of additive on the surface of standing wave 15A. Control may also be effected by controlling the speed of motor 34.

The discharge of the atomizer 30 is immediately adjacent the ejection or discharge point of pump rotor 20, and thus the high velocity solder stream discharged from rotor 20 atomizes the continuously injected additive to produce a fine and uniform additive dispersion in the circulating solder bath. In solder wave 15A, where the actual soldering process occurs, the finally dispersed additive uniformly coats the surface of the solder and prevents atmospheric oxygen from oxidizing such surface, thus improving the quality of the solder joints. Furthermore, the additive covers the already soldered areas, thus preventing any surface oxidation of the latter.

The invention arrangement provides for an extremely even and uniform dispersion of the additive in the molten solder, as well as for atomized distribution of the additive in the solder. It produces an even, continuous, and uniformly distributed covering layer on the surface of the solder wave 15. The particular apparatus, involving the particular positioning of atomizer 30 with respect to pump rotor 20, provides for absolute uniformity of additive application over any given period of time. The positive control of the amount of additive discharged into the molten solder, and the independence of gravitational flow, with its attendant disadvantages such as constitutional changes, degradation, and impurities, provides for flexible adaption of the additive injection in quantities adequate for actual operating conditions, with absolute reproduceability in the amount of additive added without limitation as to the time of a particular operation.

High reliability and continuous uniform quality of soldering is assured by the fact that the constitution and characteristics of the distributed additive in the solder and in the solder wave do not change during operating conditions because fresh additive is continually injected into the molten solder. Thus, no foreign substances, impurities, oxides released from surfaces to be soldered, flux, and flux residue, etc., which would be mixed with or dissolved in the additive, can interfere with the continuous uniformity of the operation.

The evenly distributed additive, particularly oil, on the surface of the standing wave will eliminate oxidation and consequently eliminate dross formation, and the oil residue accumulating on the solder surface around the nozzle area will eliminate dross formation on that surface also. There are no bubbles of oil additive to erupt from the solder wave surface to affect the soldering operation disadvantageously.

While oil has been mentioned as a specific additive in the foregoing description, it should be understood that this is by way of example only, and that the apparatus may be used for supplying any additive to a molten solder bath and to a standing solder wave. Thus, any other substances used in soldering operations, including soldering fluxes and other chemicals, can be readily injected into the molten solder by the invention arrangement, and emulsified and dispersed within the solder, thus covering the solder wave with a continuous thin layer. The apparatus is adaptable to reproduction of rosin core soldering using a standing wave, which is a very important advantage.

While a specific embodiment of the invention has been shown and described in detail to illustrate the application of the principles of the invention, it will be understood that the invention may be embodied otherwise without departing from such principles.

What is claimed is:

1. Wave soldering apparatus comprising, in combination, a tank containing molten solder; partition means dividing said tank into a solder supply section and a solder return section; a port in said partition means; pump means positioned to pump molten solder through said port from said return section to said supply section, said pump means including a rotor with a high velocity peripheral discharge; a solder discharge nozzle in solder receiving communication with said supply section and extending upwardly of said tank to provide a standing wave of solder overflowing to said return section; a reservoir containing an additive; and additive injecting means, in communication with said reservoir, and positioned to inject said additive into the molten solder as the latter is peripherally discharged from said rotor.

2. Wave soldering apparatus, as claimed in claim 1, including additive quantity control means interposed between said reservoir and said injection means and selectively operable to control the quantity of additive supplied to said injection means.

3. Wave soldering apparatus, as claimed in claim 1, including a pump connected to said additive reservoir and having a discharge connected to said injection means; and a control valve interposed between said pump and said injection means to regulate the amount of additive injected into said molten solder.

4. Wave soldering apparatus, comprising, in combination, a tank containing molten solder; partition means dividing said tank into a solder supply section and a solder return section; a port in said partition means; pump means positioned and operable to pump molten solder through said port from said return section to said supply section, said pump means including a rotor with a high velocity peripheral discharge; a solder discharge nozzle in solder receiving communication with said supply section and extending upwardly of said tank to provide a standing wave of solder overflowing to said return section; an additive reservoir; atomizing means having a discharge positioned at the periphery of said rotor to discharge additive into the molten solder as the latter is discharged peripherally from said rotor; and means connecting said atomizing means to said reservoir.

5. Wave soldering apparatus, as claimed in claim 4, including a pump having an inlet connected to said reservoir and an outlet connected to said atomizing means.

6. Wave soldering apparatus, as claimed in claim 5, including a control valve interposed between the outlet of said pump and said atomizing means to regulate the quantity and rate of supply of additive to the molten solder.

No references cited.

WHITMORE A. WILTZ, *Primary Examiner.*